US012762689B2

(12) United States Patent
Fujimoto

(10) Patent No.: US 12,762,689 B2
(45) Date of Patent: Oct. 13, 2026

(54) IMAGE PROCESSING SYSTEM, NON-TRANSITORY COMPUTER READABLE MEDIUM, AND IMAGE PROCESSING METHOD

(71) Applicant: FUJIFILM Business Innovation Corp., Tokyo (JP)

(72) Inventor: Hideki Fujimoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/452,580

(22) Filed: Aug. 21, 2023

(65) Prior Publication Data

US 2024/0331130 A1 Oct. 3, 2024

(30) Foreign Application Priority Data

Mar. 28, 2023 (JP) ................................ 2023-051804

(51) Int. Cl.

| | |
|---|---|
| ***G06T 7/00*** | (2017.01) |
| ***G06F 3/12*** | (2006.01) |
| ***G06T 5/50*** | (2006.01) |
| ***G06T 7/11*** | (2017.01) |
| ***H04N 1/00*** | (2006.01) |

(52) U.S. Cl.

CPC ............ *G06T 7/0008* (2013.01); *G06F 3/121* (2013.01); *G06T 5/50* (2013.01); *G06T 7/11* (2017.01); *H04N 1/00015* (2013.01); *G06T 2207/20221* (2013.01); *G06T 2207/30144* (2013.01)

(58) Field of Classification Search

USPC .......................................................... 382/141

See application file for complete search history.

(56) References Cited

U.S. PATENT DOCUMENTS

| | | | | |
|---|---|---|---|---|
| 11,004,194 | B2 * | 5/2021 | Mimura | G06T 7/11 |
| 2014/0211229 | A1 * | 7/2014 | Segawa | G06K 15/1889 358/1.18 |
| 2017/0351708 | A1 * | 12/2017 | Lahmann | G06F 16/5838 |
| 2018/0253023 | A1 * | 9/2018 | Imai | G03G 15/502 |
| 2020/0233356 | A1 * | 7/2020 | Seki | G03G 15/55 |
| 2021/0312607 | A1 * | 10/2021 | Lin | G06F 18/214 |

FOREIGN PATENT DOCUMENTS

| | | |
|---|---|---|
| JP | 2014235568 | 12/2014 |
| JP | 6847590 | 3/2021 |

* cited by examiner

*Primary Examiner* — Darryl V Dottin

(74) *Attorney, Agent, or Firm* — JCIPRNET

(57) ABSTRACT

An image processing system includes a processor configured to: receive location information indicating an occurrence location of a failure that has occurred on a printed material and that is designated by a user and substance information indicating substance of the failure, the printed material being generated by printing based on print data; with reference to the received information, extract, from the print data, a part to be used for reproducing the failure; and generate failure reproduction information including the extracted part.

9 Claims, 10 Drawing Sheets

IMAGE PROCESSING SYSTEM, NON-TRANSITORY COMPUTER READABLE MEDIUM, AND IMAGE PROCESSING METHOD

CROSS-REFERENCE TO RELATED APPLICATIONS

This application is based on and claims priority under 35 USC 119 from Japanese Patent Application No. 2023-051804 filed Mar. 28, 2023.

BACKGROUND

(i) Technical Field

The present disclosure relates to an image processing system, a non-transitory computer readable medium, and an image processing method.

(ii) Related Art

Suppose a case where a service provider company installs a multifunction peripheral in the office or the like of a customer to provide services. If a failure occurs on the multifunction peripheral, the service provider investigates the failure and takes a measure for early resolution or the like. The early resolution is more likely to be achieved by analyzing a failure occurrence environment and data and then reproducing the failure.

However, there are quite a few customers who refuse to provide data. Hence, for example, Japanese Patent No. 6847590 proposes technology for generating data excluding confidential information by performing machine learning on the basis of data having a failure. Japanese Unexamined Patent Application Publication No. 2014-235568 is also an example of the related art.

SUMMARY

Suppose a case where print data having a failure is acquired after the print data is processed. Even though the acquired print data is analyzed as failure reproduction data, information regarding the failure indicating, for example, what failure actually occurs and where the failure occurs is not extracted successfully, and thus the failure reproduction does not necessarily succeed reliably.

Aspects of non-limiting embodiments of the present disclosure relate to enabling part of failure print data for failure reproduction use to be extracted more reliably than in a case where a user does not designate information regarding the failure.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image processing system including a processor configured to: receive location information indicating an occurrence location of a failure that has occurred on a printed material and that is designated by a user and substance information indicating substance of the failure, the printed material being generated by printing based on print data; with reference to the received information, extract, from the print data, a part to be used for reproducing the failure; and generate failure reproduction information including the extracted part.

BRIEF DESCRIPTION OF THE DRAWINGS

An exemplary embodiment of the present disclosure will be described in detail based on the following figures, wherein.

DETAILED DESCRIPTION

Hereinafter, an exemplary embodiment of the present disclosure will be described on the basis of the drawings.

Figure 1:
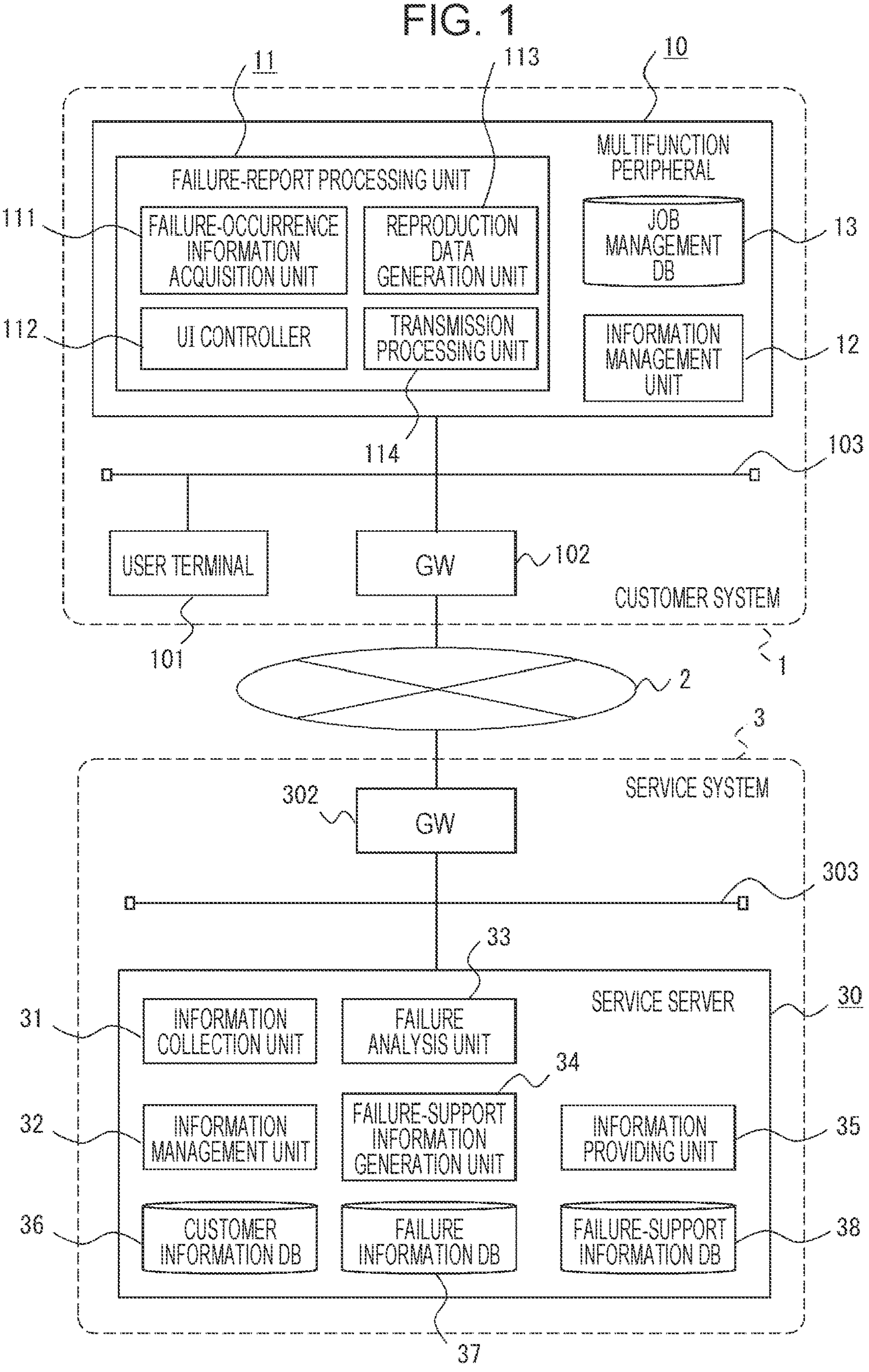
FIG. 1 is a view of the overall configuration of an exemplary embodiment of an image processing system according to the present disclosure.

FIG. 1 is a view of the overall configuration of an exemplary embodiment of an image processing system according to the present disclosure. FIG. 1 illustrates a system configuration in which a customer system 1 and a service system 3 of a service provider company are connected via a network 2 such as the Internet. The customer system 1 is built up in the office or the like of a customer, and the service provider installs a multifunction peripheral 10 to provide the customer with services. The service system 3 has multiple customers, but FIG. 1 illustrates only the customer system 1 of one customer because each customer has a system configuration equivalent to that of the customer system 1 illustrated in FIG. 1.

The customer system 1 includes the multifunction peripheral 10, user terminals 101, and a gateway (GW) 102 that are connected to a LAN 103. The customer system 1 is connected to the external network 2 with the GW 102 interposed therebetween. Each user terminal 101 is an example of an information processing apparatus and is used by a user who uses the multifunction peripheral 10. The user transmits a print job, for example, from one of the user terminals 101 to the multifunction peripheral 10 and thereby causes the multifunction peripheral 10 to perform printing. The multifunction peripheral 10 performs printing in accordance with print jobs each transmitted from a corresponding one of the user terminals 101 connected to the LAN 103 in a wired or wireless manner; however, FIG. 1 conveniently illustrates only one user terminal 101. In addition, multiple multifunction peripherals 10 may be connected to the LAN 103; however, FIG. 1 conveniently illustrates one multifunction peripheral 10 as a representative because each multifunction peripheral 10 is only required to have functions to be described later.

The service system 3 is configured such that a service server 30 and a GW 302 are connected to a LAN 303. The service system 3 is connected to the external network 2 with the GW 302 interposed therebetween. The service server 30 is used when the service provider provides services associated with the multifunction peripheral 10.

Figure 2:
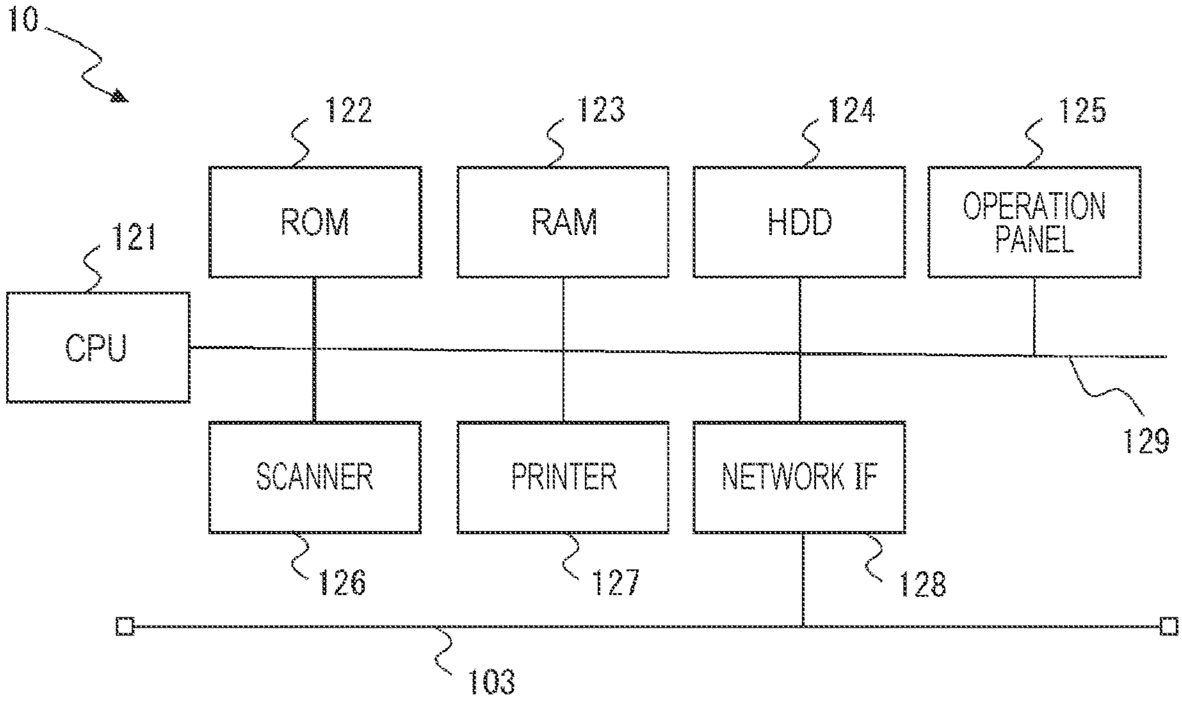
FIG. 2 is a view of the hardware configuration of a multifunction peripheral in this exemplary embodiment.

FIG. 2 is a view of the hardware configuration of the multifunction peripheral 10 in this exemplary embodiment. The multifunction peripheral 10 takes a form of an image forming apparatus having various functions such as a copying function, a printing function, and a scanning function and is an apparatus having a computer built therein. In FIG. 2, a CPU 121 controls the operations of various mechanisms such as a scanner 126 and a printer 127 of the multifunction peripheral 10 in accordance with a program stored in a ROM 122. The ROM 122 stores various programs for controlling the multifunction peripheral 10, encrypting electronic data, and transmitting and receiving the electronic data. A RAM 123 is used as a work memory in running a program and as a communication buffer in transmitting and receiving electronic data. A hard disk drive (HDD) 124 stores an electronic document or the like read by using a scanner 126. An operation panel 125 receives an instruction from the user and displays information. The scanner 126 reads a document set by the user and accumulates electronic data regarding the document in the HDD 124 or the like. The printer 127 prints an image on the output sheet in accordance with an instruction from a control program run by the CPU 121. A network interface (IF) 128 is connected to a network and is used for transmitting and receiving electronic data to and from an external apparatus, accessing the multifunction peripheral 10 via a browser, and the like. An address data bus 129 is connected to the various mechanisms to be controlled by the CPU 121, and thereby data communication is performed.

Referring back to FIG. 1, the multifunction peripheral 10 in this exemplary embodiment has a failure-report processing unit 11, an information management unit 12, and a job management database (DB) 13. The multifunction peripheral 10 has functions (not illustrated) such as components that implement various functions; however, components not used for the description of this exemplary embodiment are omitted in FIG. 1.

When the multifunction peripheral 10 has a failure, the failure-report processing unit 11 executes a process for reporting the failure to the service server 30 in accordance with an instruction from the user. The failure-report processing unit 11 has a failure-occurrence information acquisition unit 111, a user interface (UI) controller 112, a reproduction data generation unit 113, and a transmission processing unit 114. The failure-occurrence information acquisition unit 111 receives, as failure occurrence information, information identifying a failure designated by the user. The failure occurrence information includes location information indicating the occurrence location of a failure occurring on the printed material generated by printing based on print data and substance information indicating the substance of the failure. The print data is data designated in the print job and referred to when the printer 127 performs printing. In the description of this exemplary embodiment, a case where the print data is described in a print description language (PDL) is taken as an example. It goes without saying that the print data is not limited to the description in the PDL.

The UI controller 112 performs control of communication between the user and the failure-occurrence information acquisition unit 111 performed using the operation panel 125 when the failure-occurrence information acquisition unit 111 acquires the failure occurrence information. The reproduction data generation unit 113 extracts a part to be used to reproduce the failure from the print data with reference to the failure occurrence information received by the failure-occurrence information acquisition unit 111 and generates, as failure reproduction information, data for reproduction (referred to as reproduction data) including the extracted part. The transmission processing unit 114 transmits the reproduction data generated by the reproduction data generation unit 113 to the service server 30.

The information management unit 12 manages information handled by the multifunction peripheral 10. For example, the information management unit 12 manages jobs held in the job management DB 13 and failure support information transmitted from the service server 30.

The components 11 and 12 of the multifunction peripheral 10 are implemented by cooperation operation between a computer installed in the multifunction peripheral 10 and a program run by the CPU 121 installed in the computer. The job management DB 13 is implemented by the HDD 124 installed in the multifunction peripheral 10. Alternatively, the RAM 123 or an external memory may be used via the network.

The service server 30 is a major information processing apparatus that operates when the service system 3 provides the customer with a service. The service server 30 in this exemplary embodiment may be implemented by a hardware configuration of an existing general-purpose server computer. The service server 30 thus has a CPU, a ROM, a RAM, a HDD serving as a memory, and a network interface provided as a communication medium. This exemplary embodiment is described on the assumption that the service server 30 is implemented by one information processing apparatus; however, the service server 30 may be implemented in such a manner that the components illustrated in FIG. 1 are distributed to multiple information processing apparatuses.

As illustrated in FIG. 1, the service server 30 has an information collection unit 31, an information management unit 32, a failure analysis unit 33, a failure-support information generation unit 34, an information providing unit 35, a customer information DB 36, a failure information DB 37, and a failure-support information DB 38. Components not used for the description of this exemplary embodiment are omitted in FIG. 1.

The information collection unit 31 collects information transmitted from the multifunction peripheral 10 as part of the provided service. The information collection unit 31 also receives reproduction data transmitted in accordance with the user operation when the multifunction peripheral 10 has a failure.

The information management unit 32 manages customer information received by the information collection unit 31 and the failure information including reproduction data. The failure analysis unit 33 analyzes the failure that has occurred in the multifunction peripheral 10, for example, by reproducing the failure on the basis of the reproduction data. The failure-support information generation unit 34 generates information regarding the failure as the failure support information with reference to the customer information and the failure information and accumulates the generated information in the failure-support information DB 38. The information providing unit 35 provides the customer with the failure support information as part of the services.

The components 31 to 35 in the service server 30 are implemented by cooperation operation between the computer configured as the service server 30 and a program run by a CPU installed in the computer. The DBs 36 to 38 are implemented by the HDD installed in the service server 30. Alternatively, the RAM or an external memory may be used via the network.

The programs used in this exemplary embodiment may be provided not only by a communication medium but also in such a manner as to be stored in a computer readable recording medium such as a CD-ROM or a USB memory. The programs provided from the communication medium or the recording medium are installed in the computer, and the CPU of the computer serially runs the programs. Various processes are thereby implemented.

Operations in this exemplary embodiment will then be described. The multifunction peripheral 10 has various functions; however, description for this exemplary embodiment is focused on the printing function of the multifunction peripheral 10.

According to a contract with a customer, the service system 3 of the service provider in this exemplary embodiment holds information regarding the multifunction peripheral 10 of the customer, such as a model and optional devices of the multifunction peripheral 10 installed in the site of the customer. The information collection unit 31 in the service server 30 has a function of collecting pieces of information regarding operating state and consumables based on a meter or the like indicating the consumption of consumables such as printing sheets and ink. The information collection unit 31 further has a function of collecting information to be stored in the multifunction peripheral 10, such as information regarding the user terminal 101 used for a printing instruction to the multifunction peripheral 10 and printing tendency, and collects and accumulates the pieces of customer information regarding the customer in a customer information DB 36. Examples of the information regarding the user terminal 101 include the OS of the user terminal 101, patch information, information regarding a printing application used for the printing, and job information. The information collection unit 31 collects these pieces of information regardless of whether a failure occurs. The information collection unit 31 further accumulates information regarding a failure occurring in the multifunction peripheral 10 in the failure information DB 37, separately from the customer information. The customer information and the failure information are related to each other with the identification of the customer or the like.

The failure-support information generation unit 34 generates the failure support information, for example, in such a manner as to analyze on which model the failure has occurred, what the failure is, and when the failure has occurred and to group similar failures. The failure-support information generation unit 34 creates a failure-support information DB by registering the generated failure support information in the failure-support information DB. The failure-support information generation unit 34 also updates the generated failure support information with a failure that has newly occurred, as occasion demands. As described above, the information collection unit 31 collects the failure information in response to the occurrence of a failure in the site of a customer, while the information providing unit 35 provides a customer, as occasion demands, with the failure support information in response to the occurrence of a failure associated with the customer or a failure similar to the failure, the failure being managed with the failure support information. The service provider provides the customer with a service related to consumables replenishment, measures against failures, and the like with reference to the information accumulated in the DBs 36 to 38 held and managed as described above.

Suppose a case where a failure occurs when the user performs printing with the multifunction peripheral 10. In this case, the multifunction peripheral 10 automatically transmits failure information to the service server 30. Apart from the automatic transmission, the customer contacts the service provider to request the service provider to work out a solution to the failure in accordance with an instruction from the customer. Note that the output of a printing result (that is, a printed material) not intended by the customer is regarded as a failure. Whether a failure occurs may be determined in such a manner that the user verifies, for example, the printing state of a printed material such as corrupted text output by printing execution of print data by the multifunction peripheral 10.

The service provider takes a countermeasure for a solution to the failure in response to the contact by the customer. To solve the failure early, the cause of the failure occurrence is typically analyzed. To achieve this, it is effective and efficient to reproduce the failure that has occurred. Accordingly, if possible, it is appropriate to obtain print data used for the actual printing execution at the time of the failure occurrence (hereinafter, also referred to failure data) and to reproduce the failure by executing the printing of the obtained failure data.

However, quite a few customers refuse to provide the failure data as it is because of the confidential information inclusion or the like in the failure data. Hence, this exemplary embodiment is configured to enable extraction of minimum information required for the failure analysis from the failure data. In addition, to more effectively and efficiently extract the minimum required information, the user is caused to designate a part where the failure occurs.

Figure 3:
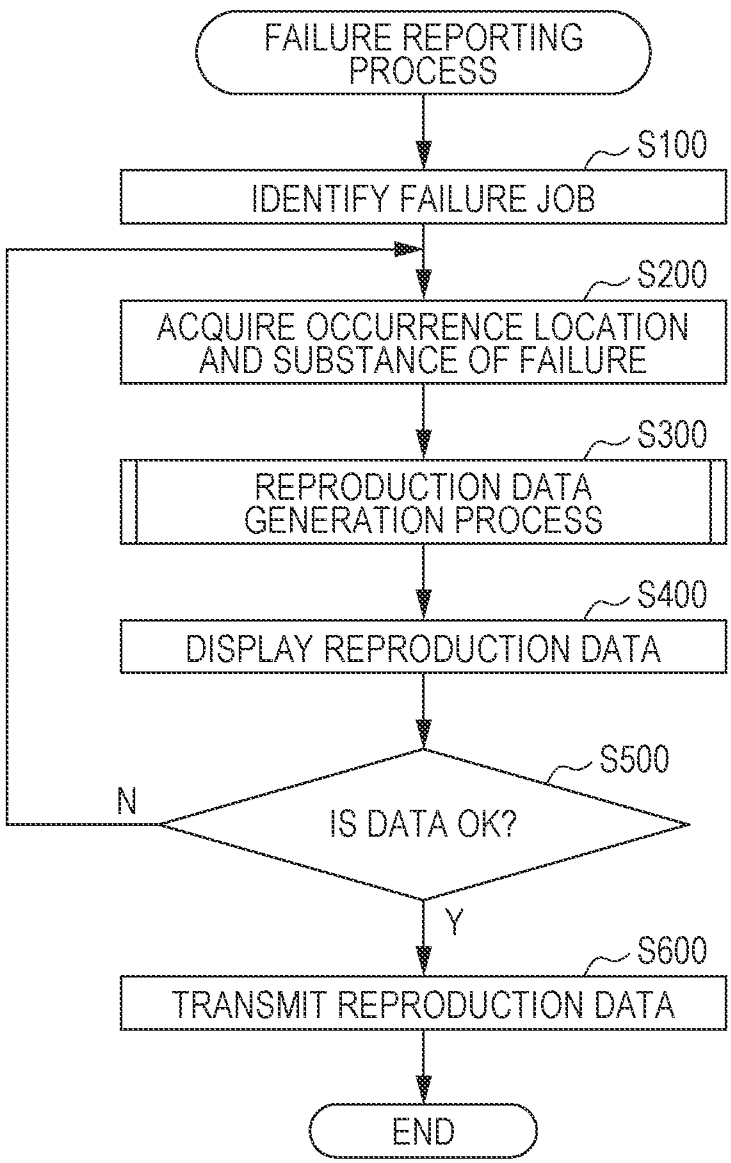
FIG. 3 is a flowchart illustrating a failure report process in this exemplary embodiment.

As described above, if the multifunction peripheral 10 has a failure, the customer reports the occurrence of the failure to the service provider for failure resolution or the like. In this exemplary embodiment, the multifunction peripheral 10 reports the failure in accordance with an instruction from the user through user operation. Hereinafter, a failure report process executed by the multifunction peripheral 10 in this exemplary embodiment will be described by using a flowchart illustrated in FIG. 3.

If the user who causes a print job to be executed looks at a printed material serving as the printing result, admits that a failure has occurred thereon, and reports the failure to the service provider, the user performs a predetermined operation with the operation panel 125 to display a completed job list.

Figure 4:
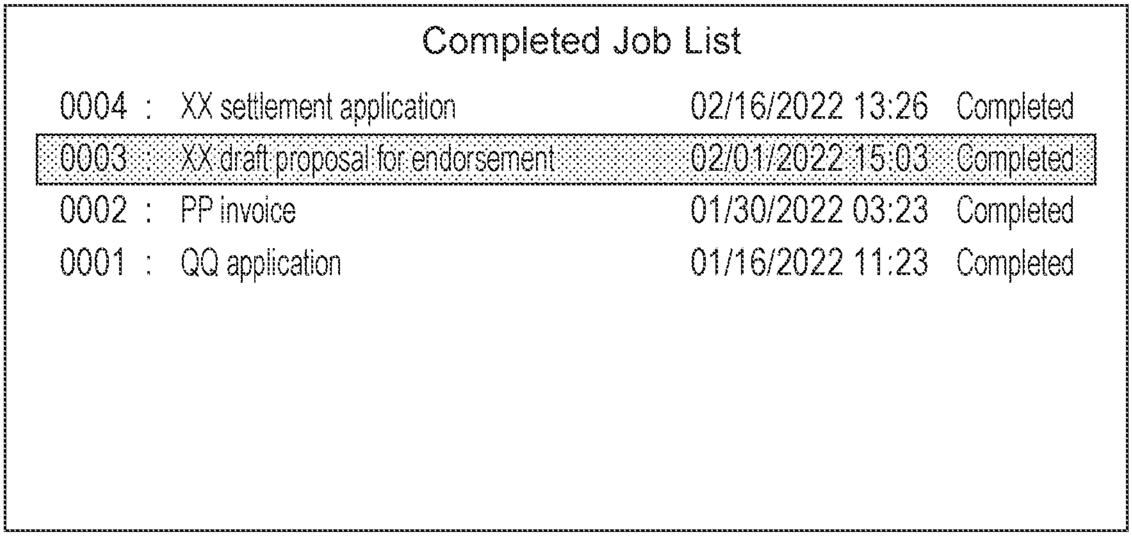
FIG. 4 is a view illustrating an example of displaying a completed job list on the operation panel in this exemplary embodiment.

FIG. 4 is a view illustrating an example of displaying the completed job list on the operation panel 125 in response to the user operation. From the completed job list, the user selects a print job executed at the time of failure occurrence. FIG. 4 illustrates an example of selecting a print job with a job ID of 0003. In response to identifying a print job selected by the user as a job having a failure (step S100), the failure-report processing unit 11 displays a Printing Failure Report screen on the operation panel 125.

Figure 5:
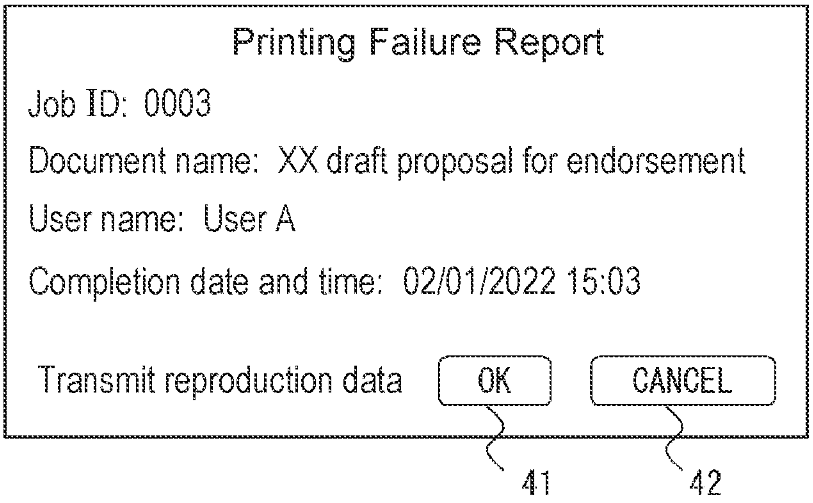
FIG. 5 is a view illustrating an example of displaying a Printing Failure Report screen in this exemplary embodiment.

FIG. 5 is a view illustrating an example of displaying the Printing Failure Report screen in this exemplary embodiment. Information regarding a job having a failure is displayed on the Printing Failure Report screen, and a print job selected by the user may be verified. If the user verifies the selected print job, the user selects an OK button 41 in the lower part of the screen. If the print job is wrongly selected, or if the processing is to be terminated, that is, if the failure reporting is to be cancelled, the user selects a CANCEL button 42.

The user selects the print job, and failure data is thereby identified. In this exemplary embodiment, the user may designate the substance of a failure in the failure data and the location of the failure. Any one of the occurrence location of the failure and the substance of the failure may be designated first; however, in this exemplary embodiment, the occurrence location of the failure is designated first.

Figure 6:
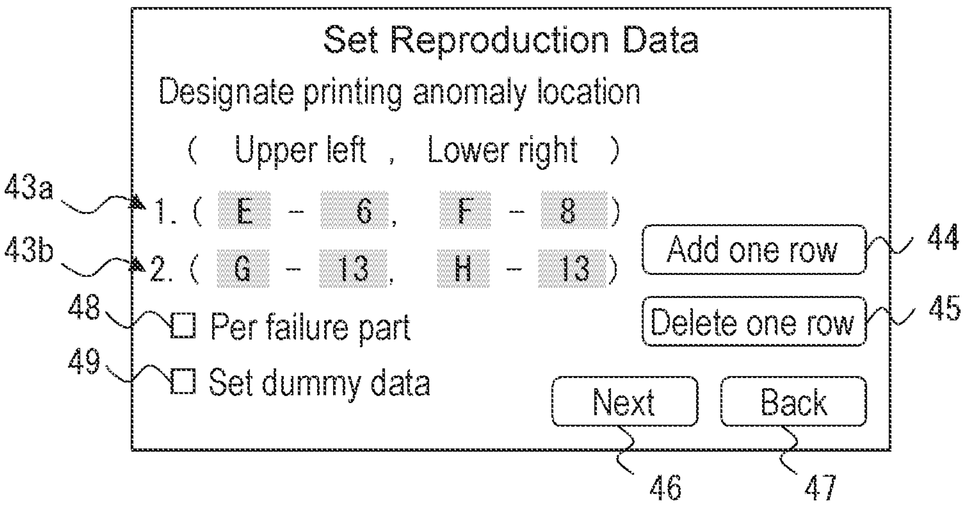
FIG. 6 is a view illustrating an example of displaying a Set Reproduction Data screen for causing a user to designate a location where a failure occurs in this exemplary embodiment.
Figure 7:
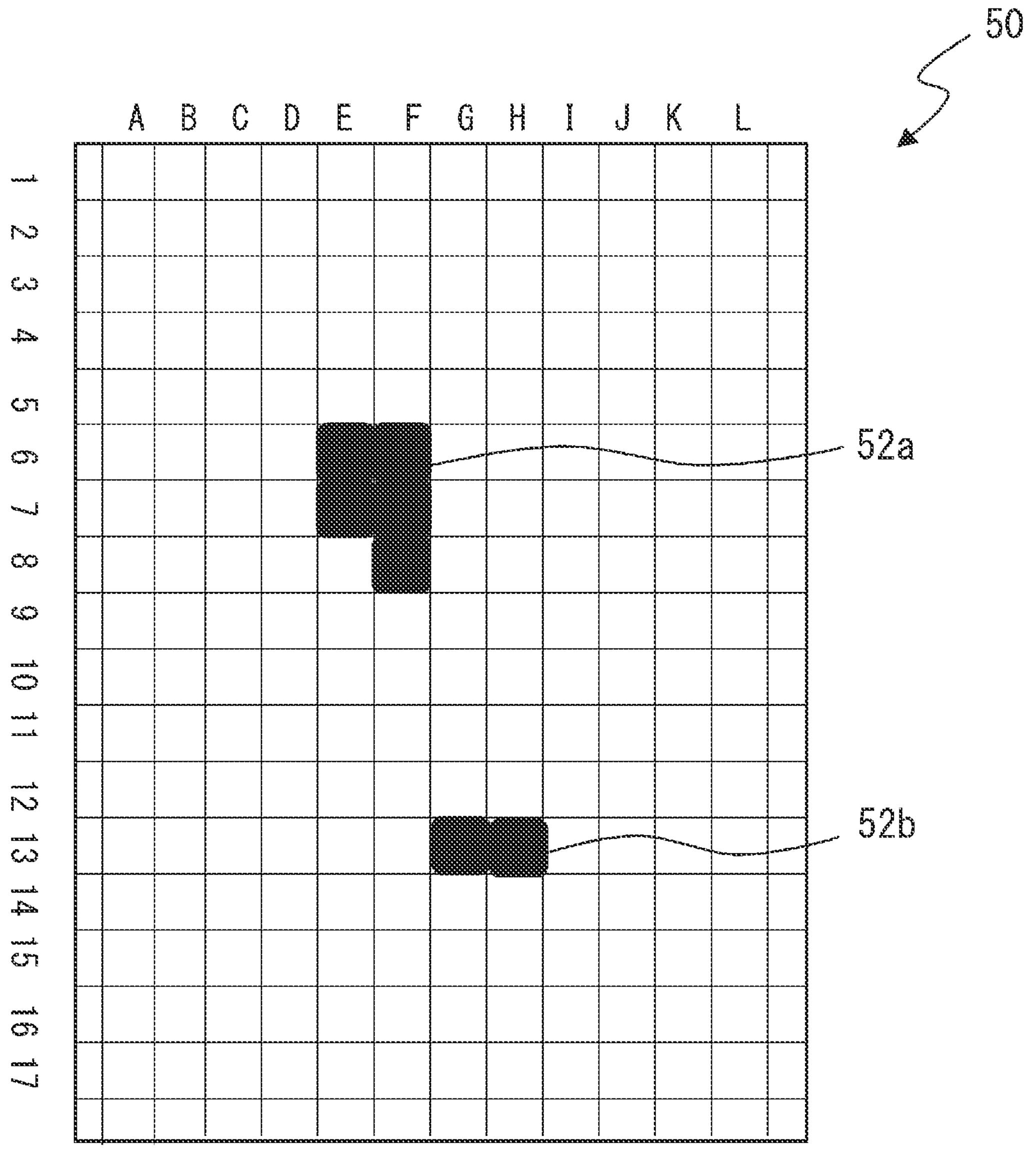
FIG. 7 is a view illustrating an example of a grid image in this exemplary embodiment.

In this exemplary embodiment, the user is caused to designate the occurrence location of the failure on the printed material. FIG. 6 illustrates an example of displaying the Set Reproduction Data screen to cause the user to designate the occurrence location of the failure. FIG. 7 is a view illustrating an example of a grid image displayed on the operation panel 125 taken as a specific example for causing the user to designate the occurrence location of the failure.

For example, the user scans a printed material having a failure, and the failure-occurrence information acquisition unit 111 thereby reads the printed material. The failure-occurrence information acquisition unit 111 subsequently displays the read image of the printed material on the operation panel 125 in such a manner that the grid image illustrated in FIG. 7 is superimposed on the read image displayed on the operation panel 125, and the printed material having multiple subdivided areas (hereinafter, referred to as cells) may thereby presented. In FIG. 7, the illustration of the read image is omitted. As illustrated in FIG. 7, the English letters are allocated in the lateral direction of the grid image, and numerals are allocated in the longitudinal direction. The location of each cell may thus be identified from a pair of an English letter and a numeral. Accordingly, the user may identify the location of a cell corresponding to the occurrence location of a failure on the printed material. In the example of displaying illustrated in FIG. 7, each cell corresponding to the occurrence location of the failure is filled in black.

In this exemplary embodiment, a group range of cells designated by the user and one or more cells neighboring thereto, if any, is handled as a failure area. The group range is also referred to as a failure part on occasions. FIG. 7 illustrates an example in which failure areas 52*a* and 52*b* are designated at two positions of the printed material. When not being required to be discriminated from each other, the failure areas 52*a* and 52*b* are each collectively referred to as a failure area 52.

On the initial screen of the Set Reproduction Data screen, a failure-location designation area 43*a* for a failure area is displayed. The user refers to the image in which the grid image is superimposed on the read image illustrated in FIG. 7 and designates, as the failure-location designation area 43*a*, the failure area 52*a* serving as the first failure area. Note that in this exemplary embodiment, a failure area is conveniently handled as a rectangular area. Although the failure area 52*a* illustrated in FIG. 7 does not form a rectangle, the user sets "E-6" as the position of the upper left cell of the failure-location designation area 43*a* and sets "F-8" as the position of the lower right cell.

To designate the multiple failure areas 52, the user selects an Add one row button 44. In response to the button selection operation, the failure-occurrence information acquisition unit 111 adds and displays a failure-location designation area 43*b* for a failure area. The user sets "G-13" as the position of the upper left cell of the failure-location designation area 43*b* and sets "H-13" as the position of the lower right cell. When not being required to be discriminated from each other, the failure-location designation areas 43*a* and 43*b* are each collectively referred to as a failure-location designation area 43.

A Delete one row button 45 for deleting the added failure-location designation area 43 is provided on the Set Reproduction Data screen. In this exemplary embodiment, "Per failure part" and "Set dummy data" on the Set Reproduction Data screen are described later.

In response to the user selecting a Next button 46 after selecting the failure area 52 as described above, the failure-occurrence information acquisition unit 111 acquires, as location information, information indicating the failure occurrence location designated by inputting each failure-location designation area 43 (step S200). In this exemplary embodiment, for convenience of explanation, the failure area 52 is handled as a rectangle. However, the handling of a rectangle leads to a case where as in the failure area 52*a*, the cell "E8" not having a failure is included in the failure area 52. To avoid this, the user interface of the failure-location designation area 43 may be designed to designate the location of only one or more cells having a failure. To cancel the designation of the failure area 52, the user selects a Back button 47.

In the description above, the user designates the occurrence location of the failure by inputting the occurrence location in the failure-location designation area 43; however, the failure-occurrence information acquisition unit 111 may automatically set the failure area 52 for the failure-location designation area 43, for example, in response to the user selecting a cell on the image illustrated in FIG. 7.

In the description above, the user scans the printed material. However, scan data of the printed material is temporarily generated. Even if the scan data is generated temporarily, there is a possibility that a user wishes to avoid this. In this case, for example, the grid image illustrated in FIG. 7 is in advance formed on the platen glass, and the user places the printed material on the document bed of the multifunction peripheral 10. The grid image is thereby seen through the printed material placed on the document bed, and a printed material subdivided into the multiple areas (cells) by using the printed material and the grid image may be presented to the user.

Figure 8:
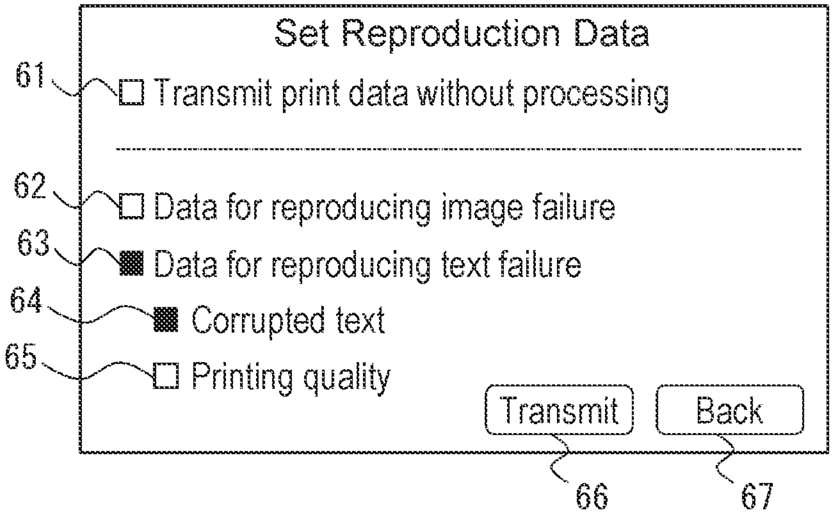
FIG. 8 is a view illustrating an example of displaying a Set Reproduction Data screen for causing the user to designate the substance of the failure in this exemplary embodiment.

After selecting the Next button 46 and acquiring the location information successfully, the failure-occurrence information acquisition unit 111 displays the Set Reproduction Data screen illustrated in FIG. 8 on the operation panel 125. FIG. 8 is a view illustrating an example of displaying the Set Reproduction Data screen for causing the user to designate the substance of the failure in this exemplary embodiment. In this exemplary embodiment, the user may designate what like the failure is anormal, that is, the substance of the failure, specifically, the failure is involved with text or involved with an image, that is, other than text. The failure involved with text includes corrupted text, a state where printing quality is not normal, and the like. The failure involved with an image includes missing in the image, drawing shift, anomaly in type, thickness, or the like of a ruled line, a stripe pattern or the like printed, and unevenness.

The failure-occurrence information acquisition unit 111 causes the user to check at least one of checkboxes 62 to 65 for failure on the Set Reproduction Data screen serving as a predetermined failure substance setting screen to thereby designate the substance of the failure. This exemplary embodiment is designed to avoid providing failure data as it is without processing because, for example, the failure data is confidential; however, a checkbox 61 is also provided for a customer who may transmit failure data as it is.

As described above, in response to the user selecting a Transmit button 66 after designating the substance of the failure, the failure-occurrence information acquisition unit 111 acquires, as substance information, information indicating the substance of the failure (step S200). To cancel the designation of the substance of the failure, the user selects a Back button 67.

The failure-occurrence information acquisition unit 111 acquires the failure occurrence information including the location information indicating the occurrence location of the failure and the substance information indicating the substance of the failure in the aforementioned manner.

Figure 9:
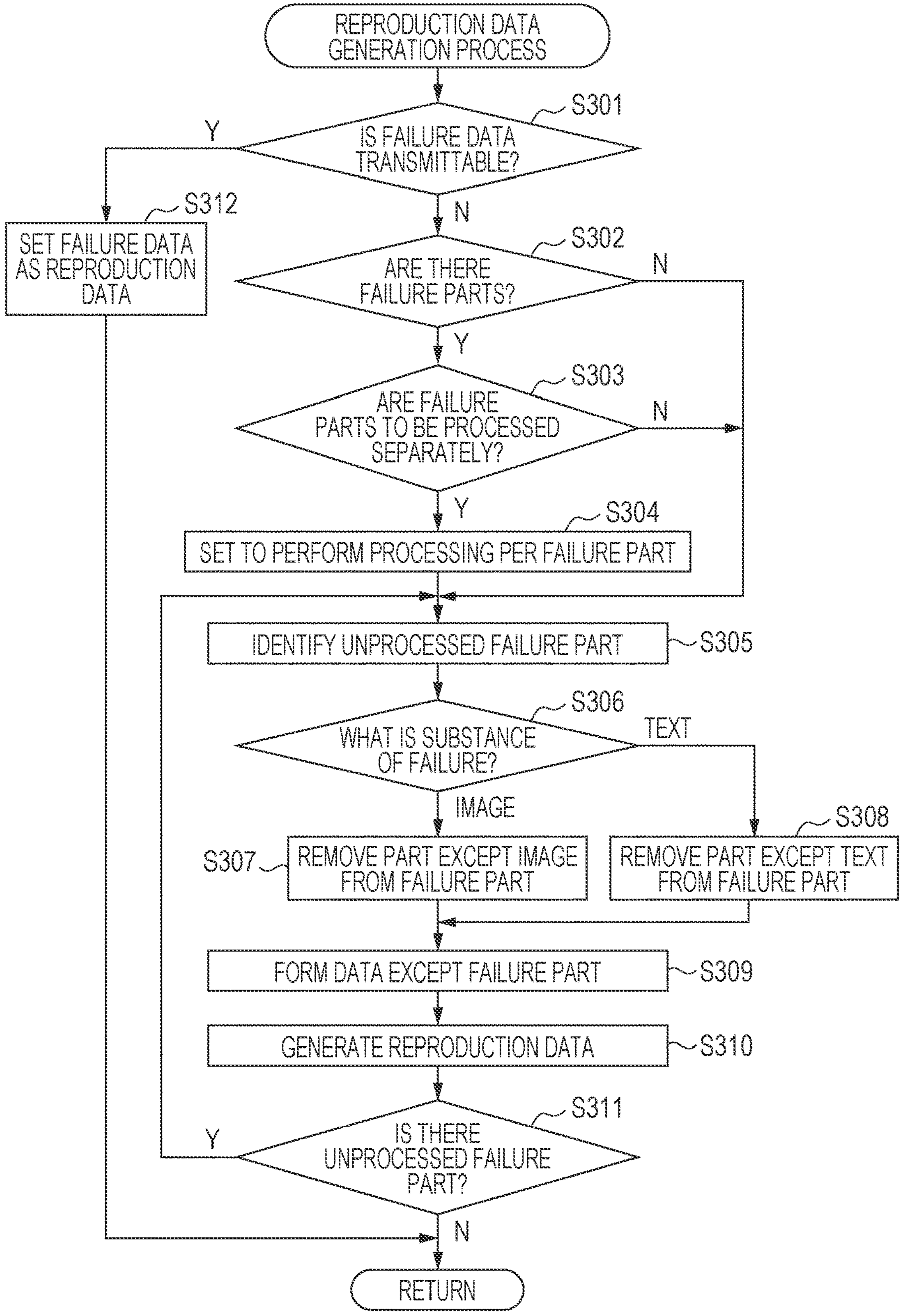
FIG. 9 is a flowchart illustrating a reproduction data generation process in this exemplary embodiment.

The reproduction data generation unit 113 subsequently generates reproduction data with reference to the failure occurrence information (step S300). A reproduction data generation process by the reproduction data generation unit 113 will be described by using a flowchart illustrated in FIG. 9.

First, if the customer checks the checkbox 61 and thereby selects transmitting the failure data as it is without processing (Y in step S301), the reproduction data generation unit 113 sets the failure data for reproduction data generation (step S312). If the customer does not select transmitting the failure data as it is (N in step S301), the reproduction data generation unit 113 subsequently refers to the failure occurrence information and thereby verifies whether the failure data includes multiple failure parts. The case where failure data includes multiple failure parts is a case where there are the multiple failure areas 52*a* and 52*b* as illustrated in FIG. 7. In addition, if a printed material has multiple pages and has multiple failure areas in different pages, it is considered that there are multiple failure areas in the printed material as a whole. If there are multiple failure parts in the failure data (Y in step S302), and if the user wishes to process the failure parts separately (Y in step S303), the reproduction data generation unit 113 sets reproduction data generation per failure part based on processing per failure part (step S304). Processing the failure parts separately leads to division of the failure data per failure occurrence, and thus it is not easy to intuitively comprehend the content of the printed material.

If the user wishes to generate corresponding reproduction data per failure part, the user is only required to check a checkbox 48 for Per failure part on the Set Reproduction Data screen illustrated in in FIG. 6. If the checkbox 48 is checked, and in response to the selection of the Next button 46, the failure-occurrence information acquisition unit 111 performs processing to enable the substance of the failure to be set per failure part on the Set Reproduction Data screen illustrated in FIG. 8.

If there is only one failure part in the failure data (N in step S302), or if the user does not wish to process the failure parts separately (N in step S303) even though there are multiple failure parts (Y in step S302), the reproduction data generation unit 113 generates one piece of reproduction data for the failure data.

The reproduction data generation unit 113 subsequently refers to the failure occurrence information and thereby identifies an unprocessed failure part (step S306) and acquires the substance of the failure corresponding to the identified failure part. If the acquired substance of the failure, that is, the failure that has occurred in the failure part and that is to be processed is a failure involved with an image (IMAGE in step S306), the reproduction data generation unit 113 removes information except the image in the corresponding failure area 52, that is, text (step S307). In contrast, if the failure that has occurred in the failure part and that is to be processed is a failure involved with text (TEXT in step S306), the reproduction data generation unit 113 removes information except the text in the corresponding failure area 52, that is, an image (step S308). A process for editing the data corresponding to the failure part of the failure data on the basis of the substance of the failure will be described specifically by using FIGS. 10A to 10C.

Figure 10A:
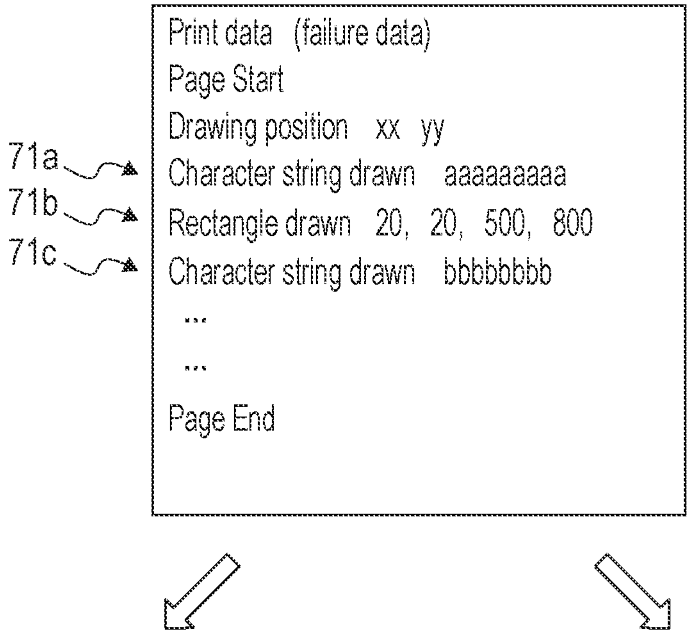
FIG. 10A is a view illustrating part of print data serving as data having a failure.
Figure 10B:
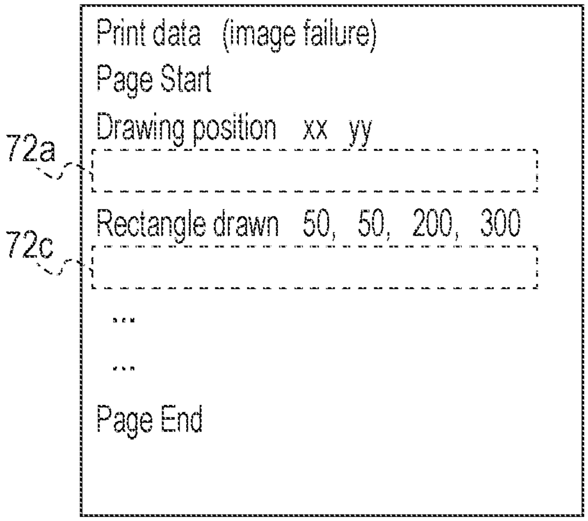
FIG. 10B is a view illustrating print data resulting from the deletion of a description except data regarding an image.

FIG. 10A is a view illustrating part of print data serving as failure data. The print data is described in the PDL as described above. If the substance of the failure in the failure area 52 is involved with an image, the reproduction data generation unit 113 sets the failure data illustrated in FIG. 10A as original data to be edited, and deletes, among descriptions in the original data, a description except data regarding the image in the failure area 52 (that is, a description regarding the printing of the image). FIG. 10B illustrates print data resulting from the deletion. Descriptions 71*a* and 71*c* illustrated in FIG. 10A are each an example of a description for drawing a character string in the failure area 52. In contrast, in the illustration in FIG. 10B, as illustrated by areas 72*a* and 72*b* surrounded by broken lines, the descriptions 71*a* and 71*c* for drawing character strings are deleted in the failure area 52, and only data regarding the image having the failure is extracted.

Figure 10C:
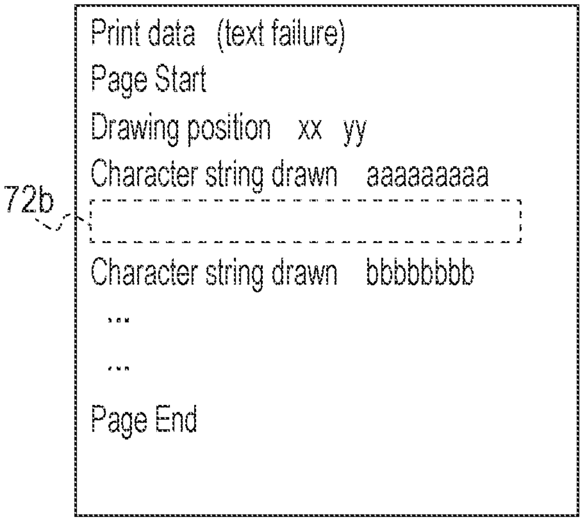
FIG. 10C is a view illustrating print data resulting from the deletion of the description except data regarding text.

If the substance of the failure in the failure area 52 is involved with text, the reproduction data generation unit 113 deletes, among the descriptions in the original data, a description except data regarding the text in the failure area 52 (that is, a description regarding the printing of the text). FIG. 10C illustrates print data resulting from the deletion. A description 71*b* illustrated in FIG. 10A is thus an example of a description for drawing an image in the failure area 52. In the illustration in FIG. 10C, as illustrated in the area 72*b* surrounded by a broken line, the description 71*b* for drawing an image in the failure area 52 is deleted, and only data regarding the text having the failure is extracted.

The reproduction data generation unit 113 edits the descriptions for printing the failure part in the above described manner. In contrast, in the processing above, the reproduction data generation unit 113 does not process a printing part corresponding to a part other than the failure part in the printed material. Hence, the reproduction data generation unit 113 forms data corresponding to the area except the failure area (step S309).

It is considered that the print data corresponding to the area except the failure part (hereinafter, also referred to as a normal area) is processed in the following manner. For example, the print data corresponding to the normal area is left without any processing. In this case, since it is possible to verify the printing state of the normal area, comparison with the failure area is performed easily, and thus the substance of the failure is identified easily. However, in consideration for a customer who does not wish to provide the service provider with the content of the printing of the normal area, the data for the normal area in the printing may be replaced with dummy data such as a blank or a predetermined pattern. In this exemplary embodiment, the data is replaced with the dummy data.

Incidentally, if the user wishes to set the dummy data for the normal area, the user is only required to check a checkbox 49 for Set dummy data on the Set Reproduction Data screen illustrated in in FIG. 6. If the checkbox 49 is checked, the reproduction data generation unit 113 may display, for example, the screen illustrated in FIG. 7 with black/white inversion and may allow the user to set dummy data for the normal area. It goes without saying that how to set dummy data is not limited to this.

After the end of settings of both of the data including only the part to be used to reproduce the failure in the failure area on the printed material and the dummy data for the normal area in the above described manner, the reproduction data generation unit 113 puts the settings together and generates reproduction data (step S310). The reproduction data generation unit 113 repeats the steps described above (steps S305 to 310) on one or more unprocessed failure parts (Y in step S311). After reproduction data corresponding to all of the failure parts is generated (N in step S311), the processing is terminated.

Referring back to FIG. 3, the UI controller 112 of the failure-report processing unit 11 displays the generated reproduction data on the operation panel 125 (step S400). The reproduction data may be displayed in the PDL or as a printing result of execution by the multifunction peripheral 10, that is, in a form of an output image. The user verifies the content of the generated reproduction data. If there is no problem with the reproduction data, the user permits the transmission of the data. If the user permits the transmission (Y in step S500), the transmission processing unit 114 transmits the reproduction data to the service server 30 (step S600). In contrast, if the user does not permit the transmission of the reproduction data (N in step S500), the failure-report processing unit 11 moves the processing back to step S200 and causes the user to select the occurrence location of the failure and the substance again. The processing in the case where the user selects disapproval of the transmission of the reproduction data is not limited to this. The processing may be performed in such a manner as to terminate the failure report process and stop the transmission of the reproduction data.

In the service server 30, in response to receiving the reproduction data, the information collection unit 31 transmits the reproduction data to a person in charge and thereby reports the occurrence of the failure. The person in charge operates the failure analysis unit 33 and analyzes the failure. Alternatively, the person in charge may handle the failure in such a manner as to reproduce the failure after taking the reproduction data to the site of the customer.

In this exemplary embodiment, the reproduction data is generated in such a manner that only data attributed to the occurrence of the failure is extracted from the failure area of the failure data. Accordingly, the customer may provide data involved with the failure in a state where information not intended to provide the service provider, such as confidential information, is removed from the failure data.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An image processing system includes:

a processor configured to:

receive location information indicating an occurrence location of a failure that has occurred on a printed material and that is designated by a user and substance information indicating substance of the failure, the printed material being generated by printing based on print data;

with reference to the received information, extract, from the print data, a part to be used for reproducing the failure; and generate failure reproduction information including the extracted part.

(((2)))

In the image processing system according to (((1))), the processor is configured to:

present the printed material to the user, the printed material having multiple areas that are subdivided; and receive, as the location information, an area designated by the user from among the multiple areas in the presented printed material.

(((3)))

In the image processing system according to (((2))), the processor is configured to: present the printed material having the multiple subdivided areas to the user by displaying a grid image superimposed on an image resulting from reading of the printed material.

(((4)))

In the image processing system according to (((2))), the processor is configured to: present the printed material having the multiple subdivided areas to the user by causing a grid image displayed on a document bed of a printer to be seen through the printed material placed on the document bed.

(((5)))

In the image processing system according to any one of (((1))) to (((4))), the processor is configured to:

cause the user to designate the substance of the failure from a failure substance setting screen that is predetermined; and edit data corresponding to the occurrence location of the failure in the print data in accordance with the designated substance of the failure.

(((6)))

In the image processing system according to (((5))), the processor is configured to: in response to the designated substance of the failure being a failure involved with text, extract only data regarding the text from the data to be edited and generate the failure reproduction information.

(((7)))

In the image processing system according to (((5))), the processor is configured to: in response to the designated substance of the failure being a failure involved with an image, extract only data regarding the image from the data to be edited and generate the failure reproduction information.

(((8)))

A program causes a computer to execute a process including:

receiving location information indicating an occurrence location of a failure that has occurred on a printed material and that is designated by a user and substance information indicating substance of the failure, the printed material being generated by printing based on print data;

with reference to the received information, extracting, from the print data, a part to be used for reproducing the failure; and generating failure reproduction information including the extracted part.

What is claimed is:

1. An image processing system comprising:

a processor configured to:

display a set reproduction data screen to cause a user to designate an occurrence location of a failure that has occurred on a printed material;

receive location information indicating the occurrence location of the failure designated by the user by inputting the occurrence location in a user interface of the failure-location designation area;

display a failure substance setting screen that is predetermined to cause the user to designate a substance of the failure;

receive substance information indicating the substance of the failure by checking at least one of checkboxes for the failure on the failure substance setting screen, the printed material being generated by printing based on print data;

with reference to the received information, extract, from the print data, a part to be used for reproducing the failure; and generate failure reproduction information including the extracted part.

2. The image processing system according to claim 1, wherein the processor is configured to:

present the printed material to the user, the printed material having a plurality of areas that are subdivided; and receive, as the location information, an area designated by the user from among the plurality of areas in the presented printed material.

3. The image processing system according to claim 2, wherein the processor is configured to: present the printed material having the plurality of subdivided areas to the user by displaying a grid image superimposed on an image resulting from reading of the printed material.

4. The image processing system according to claim 2, wherein the processor is configured to: present the printed material having the plurality of subdivided areas to the user by causing a grid image displayed on a document bed of a printer to be seen through the printed material placed on the document bed.

5. The image processing system according to claim 1, wherein the processor is configured to:

edit data corresponding to the occurrence location of the failure in the print data in accordance with the designated substance of the failure.

6. The image processing system according to claim 5, wherein the processor is configured to: in response to the designated substance of the failure being a failure involved with text, extract only data regarding the text from the data to be edited and generate the failure reproduction information.

7. The image processing system according to claim 5, wherein the processor is configured to: in response to the designated substance of the failure being a failure involved with an image, extract only data regarding the image from the data to be edited and generate the failure reproduction information.

8. A non-transitory computer readable medium storing a program causing a computer to execute a process comprising:

displaying a set reproduction data screen to cause a user to designate an occurrence location of a failure that has occurred on a printed material;

receiving location information indicating the occurrence location of the failure designated by the user by inputting the occurrence location in a user interface of the failure-location designation area;

displaying a failure substance setting screen that is predetermined to cause the user to designate a substance of the failure;

receiving substance information indicating the substance of the failure by checking at least one of checkboxes for the failure on the failure substance setting screen, the printed material being generated by printing based on print data;

with reference to the received information, extracting, from the print data, a part to be used for reproducing the failure; and generating failure reproduction information including the extracted part.

9. An image processing method comprising:

displaying a set reproduction data screen to cause a user to designate an occurrence location of a failure that has occurred on a printed material;

receiving location information indicating the occurrence location of the failure designated by the user by inputting the occurrence location in a user interface of the failure-location designation area;

displaying a failure substance setting screen that is predetermined to cause the user to designate a substance of the failure;

receiving substance information indicating the substance of the failure by checking at least one of checkboxes for the failure on the failure substance setting screen, the printed material being generated by printing based on print data;

with reference to the received information, extracting, from the print data, a part to be used for reproducing the failure; and generating failure reproduction information including the extracted part.

* * * * *